United States Patent

McJones

[15] 3,650,255

[45] Mar. 21, 1972

[54] METHOD AND SYSTEM FOR REDUCING OXIDES OF NITROGEN AND OTHER POLLUTANTS FROM INTERNAL COMBUSTION ENGINES

[72] Inventor: Robert W. McJones, 529 Via Del Monte, Palos Verdes Estates, Calif. 90274

[22] Filed: Sept. 17, 1969

[21] Appl. No.: 858,816

[52] U.S. Cl..................................123/120, 48/184, 123/1, 123/121
[51] Int. Cl.................................F02m 21/02, F02m 13/08
[58] Field of Search.......................123/120, 121, 1; 48/184

[56] References Cited

UNITED STATES PATENTS

| | | | |
|---|---|---|---|
| 2,927,848 | 3/1960 | Baverstock | 48/184 |
| 2,983,592 | 5/1961 | Jones | 48/184 |
| 3,123,451 | 3/1964 | Baverstock | 48/184 |
| 3,184,295 | 5/1965 | Baverstock | 48/184 |

OTHER PUBLICATIONS

The Automobile and Air Pollution, A Program For Progress Part II, pages 46 and 47, Dec. 1967, U.S. Government Printing Office

*Primary Examiner*—Wendell E. Burns
*Attorney*—Christie, Parker & Hale

[57] ABSTRACT

Oxides of nitrogen ($NO_x$) in the exhaust gas emissions of an internal combustion engine are reduced, as measured on a standard 7-mode driving cycle, by utilizing natural gas as a fuel and operating with an equivalence ratio from about 1.25 to about 1.35. The 1.25 value corresponds to the maximum permissible amounts of $NO_x$ as measured in parts per million. The 1.35 value corresponds to the value where unacceptable power loss would result if exceeded. A gas-air mixer having a metering pin modified to operate with a natural gas inlet pressure of from —0.5 inches of $H_2O$ to +0.5 inches of $H_2O$ and within the specified range of equivalence ratios is employed. A modulator produces a fuel-rich condition at full throttle to increase power.

12 Claims, 8 Drawing Figures

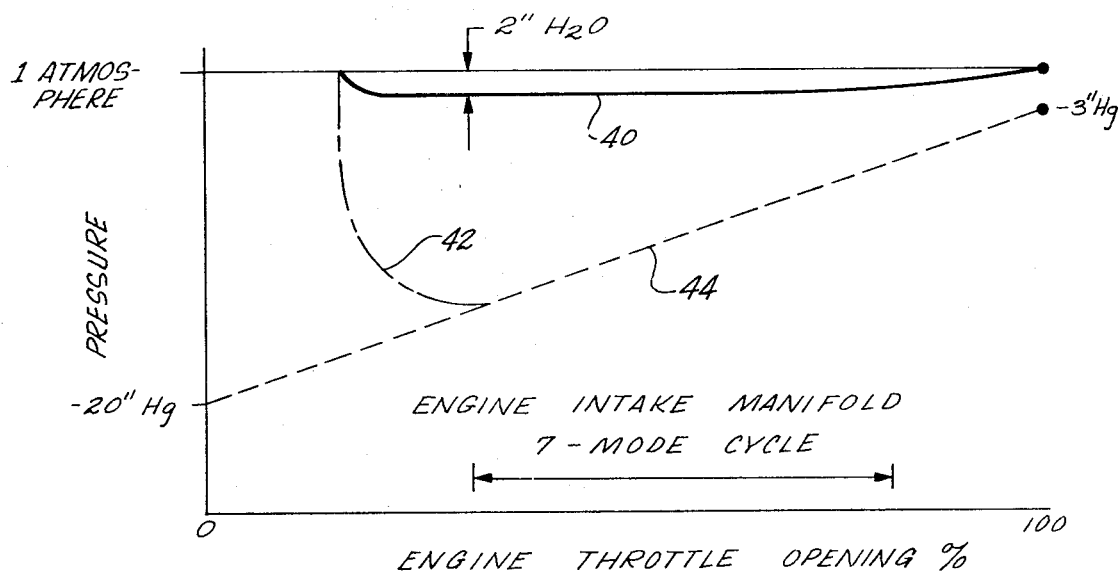
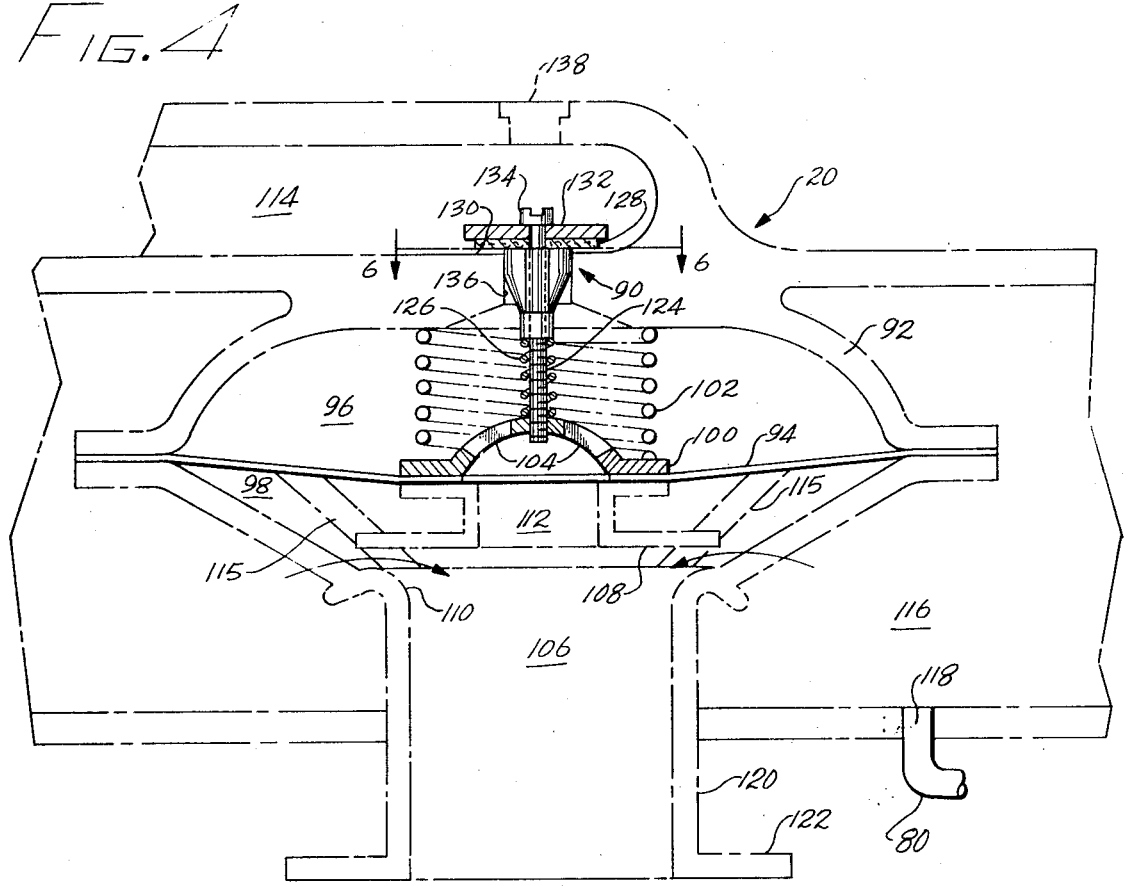

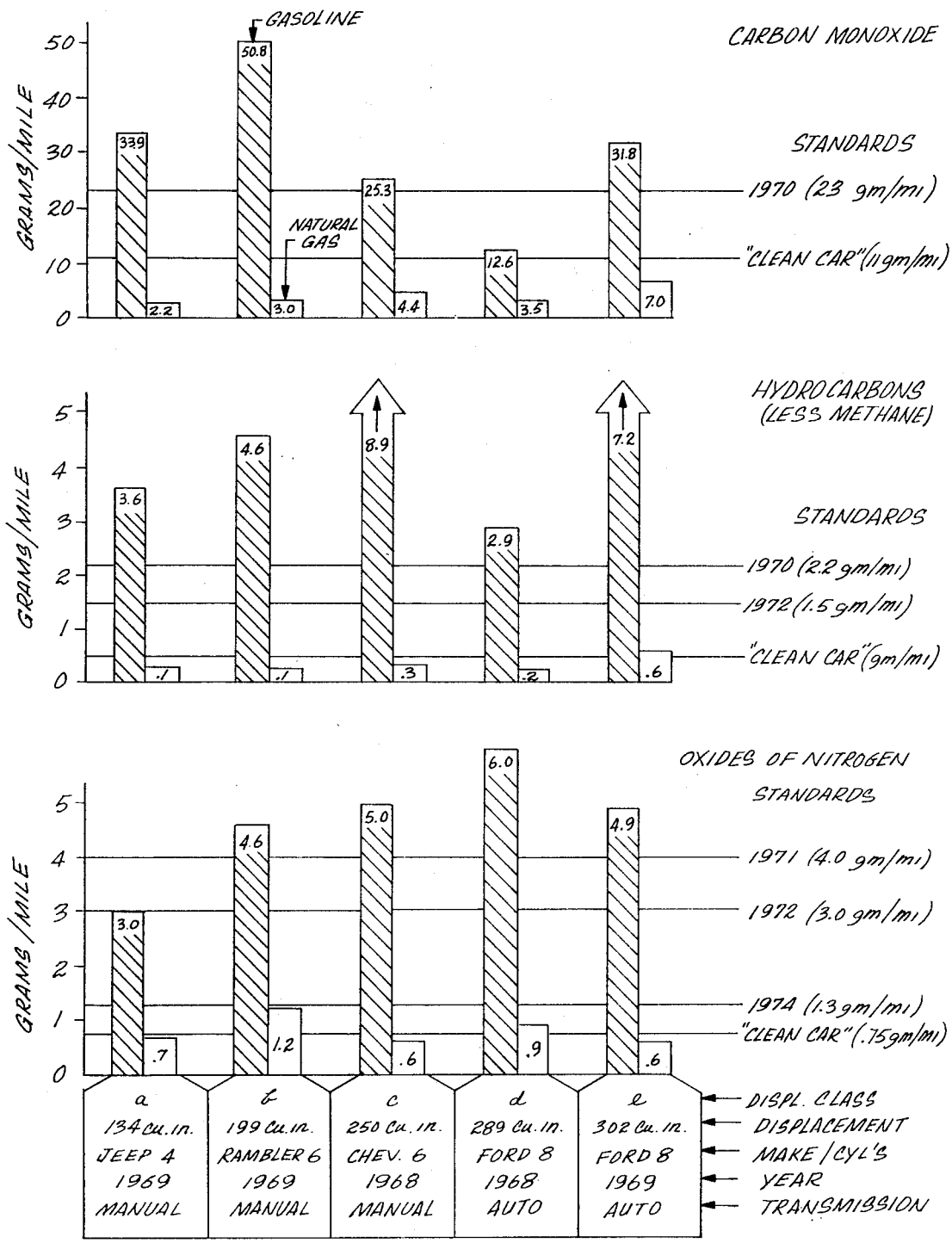

METHOD AND SYSTEM FOR REDUCING OXIDES OF NITROGEN AND OTHER POLLUTANTS FROM INTERNAL COMBUSTION ENGINES

BACKGROUND OF THE INVENTION

The present invention relates to a system and method for reducing oxides of nitrogen in the exhaust of an internal combustion engine utilizing a gaseous fuel by maintaining a predetermined, very lean air-to-fuel ratio during operation.

Extensive efforts have been made to reduce noxious emissions from internal combustion engines. It is well known that the emissions from internal combustion engines are a major ingredient in production of air pollution or smog. Recent standards have been established for permissible amounts of exhaust pollutants. In general these standards relate to hydrocarbon pollutants which are susceptible to photochemical reaction to produce smog.

In an effort to reduce the amount of hydrocarbon emissions responsible for photochemically produced smog, it has been the practice to increase the air-fuel ratio, that is, to produce a lean charge. These efforts have produced a marked reduction in the amount of hydrocarbons in the exhaust of internal combustion engines. However, they have had an attendant pernicious effect in increasing the amount of oxides of nitrogen in the exhaust gas pollutants.

Accordingly, there is a need to reduce the oxides of nitrogen in exhaust gas pollutants while at the same time maintaining acceptable levels of hydrocarbon pollutants.

SUMMARY OF THE INVENTION

The present invention provides a method and a system for operating an internal combustion engine with reduced emissions, especially oxides of nitrogen.

Briefly, the method of the present invention contemplates the utilization of a gaseous fuel, such as natural gas, for operation of an internal combustion engine within a prescribed range of equivalence ratios. The equivalence ratio, defined as the ratio of air-to-fuel divided by the air-to-fuel ratio at stoichiometric, is maintained over a standard 7-mode cycle for about 1.25 to about 1.35, with 1.3 being referred. A mixture of gaseous fuel and air within this range of equivalence ratios is introduced into the combustion chambers of an internal combustion engine. The mixture is then burned in the combustion chamber to operate the engine.

It has been found that within the equivalence ratio range specified, the oxides of nitrogen on a parts per million basis are very low and generally within acceptable standards. It has also been found that within this equivalence ratio range, the amount of oxides of nitrogen in the exhaust gas is reproducible for a variety of different internal combustion engine designs. In addition, it has been found that through the use of gaseous fuels as fuel, the equivalence ratio range set forth is much leaner than that obtainable with gasoline, and as a consequence the $NO_x$ levels are much lower for natural gas fuels than for gasoline.

Operation within the equivalence ratio range specified results in less than optimum power. This is because the air-fuel ratio is very lean. However, occasions arise when full throttle, high load operation requires optimum power. The method of the present invention contemplates, in a preferred embodiment, that the equivalence ratio be shifted toward stoichiometric or the optimum power ratio at full throttle.

It has been found that substantially pure methane, as opposed to natural gas which is largely methane, produces less $NO_x$ than does natural gas. Accordingly, it is preferred in the method of the present invention to use methane as a fuel.

In terms of apparatus, the present invention contemplates a system which includes means for regulating a gaseous fuel to obtain gaseous fuel at a pressure within a predetermined pressure range for introduction into a fuel-air mixer, the fuel-air mixer, and means for obtaining a gaseous fuel-air mixture within an equivalence ratio range of from about 1.25 to about 1.35.

It is preferred in the system, as in the process, to provide means which shift the air-fuel ratio toward the full power value.

These and other features, aspects and advantages of the present invention will become more apparent from the following description, appended claims and drawings.

BRIEF DESCRIPTION OF THE DRAWINGS

FIG. 3 is a plot of pressure as a function of throttle opening to and in the understanding of the means of the present invention which obtains increased power at full throttle;

FIG. 4 shows a gas-air mixer suitable for the system and method of the present invention;

FIG. 8 is a bar chart showing exhaust gas emissions comparisons between gasoline and natural gas.

DESCRIPTION OF THE PREFERRED EMBODIMENT

Figure 1:
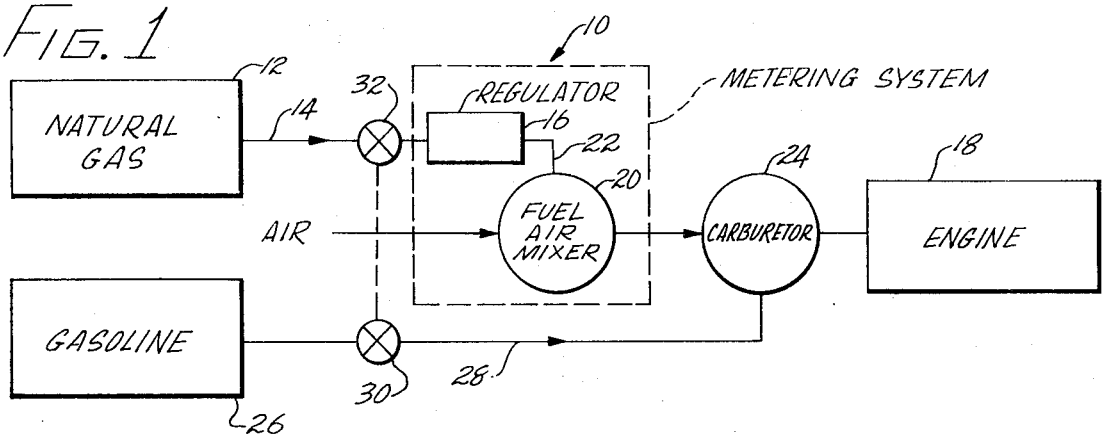
FIG. 1 is a schematic diagram depicting the system of the present invention.

With reference to FIG. 1, a schematic depiction of a dual fuel system 10 for internal combustion engines is presented. The dual fuel system is capable of using gasoline as one fuel or natural gas as the other.

The duel fuel system has a natural gas storage tank 12. The natural gas storage tank may be for compressed natural gas or liquid natural gas. A line 14 goes from the natural gas tank to a series of regulators 16. The regulators provide stages of regulation to reduce the pressure of the natural gas to a level commensurate with introduction into an engine 18. A fuel-air mixer 20 is coupled to regulators 16 through a line 22. A carburetor 24, of standard design, is downstream from the fuel-air mixer. The fuel-air mixer is mounted on the carburetor and the carburetor is coupled to the engine in a standard manner.

A gasoline tank 26 is coupled to carburetor 24 through a line 28. A valve 30 is disposed in line 28 to control gasoline flow to carburetor 24. A valve 32 is disposed in line 14 to control the natural gas flow to fuel-air mixer 20. Valves 30 and 32 are ganged such that when one is open the other is closed.

In general, when natural gas is used as the fuel, valve 32 is open and valve 30 is closed. Natural gas from tank 12 passes through open valve 32 for regulation in regulators 16. Natural gas leaving the regulators passes into the fuel-air mixer where it mixes with air from atmosphere for introduction into engine 18.

The air-fuel ratio is conveniently expressed as an equivalence ratio ($\phi$) which is defined as the ratio air-to-fuel divided by the ratio air-to-fuel at stoichiometric. The equivalence ratio of the present invention is from about 1.25 to about 1.35. A gas-air mixture within this range of equivalence ratios is fed through the carburetor and into an engine for the latter's operation.

It has been found that a standard internal combustion engine is operable within the range of equivalence ratios of 1.25 to 1.35 on gaseous fuels such as natural gas. It is believed that, except possibly in laboratory operation with a CFR engine, the misfire limit for an engine fueled by gasoline corresponds to an equivalence ratio in the neighborhood of 1.15. Thus, it has been found that with the use of natural gas, an engine may operate satisfactorily with a very lean mixture and a concomitant reduction in pollutants of $NO_x$ in the exhaust gas.

Figure 2:
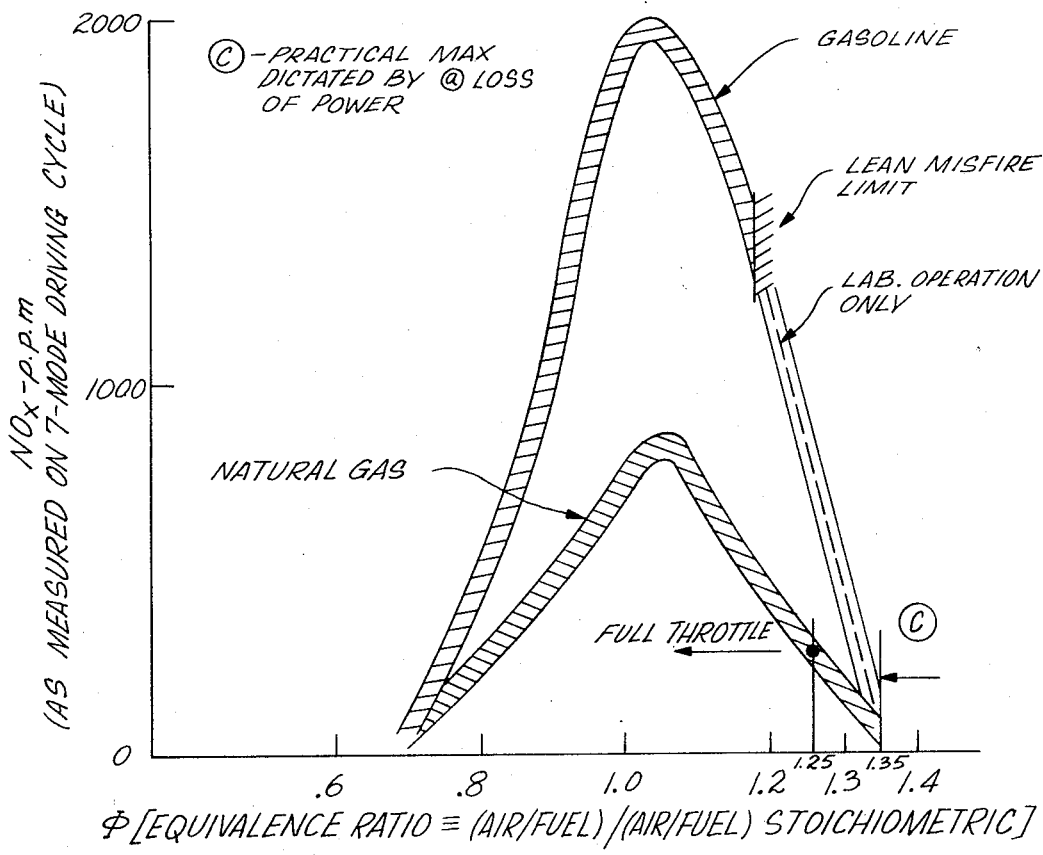
FIG. 2 is a plot of the oxides of nitrogen ($NO_x$), measured in parts per million, versus equivalence ratio.

FIG. 2 illustrates more clearly the amount of $NO_x$ in parts per million as a function of equivalence ratio. The ordinate represents parts per million $NO_x$ as measured on the 7-mode driving cycle described in Volume 33 of the Federal Register (June 4, 1968). The upper curve is for gasoline while the lower curve is for natural gas. It will be noted that over substantially the entire range depicted at a given equivalence ratio natural gas produces less parts $NO_x$ than does gasoline. It is of course desirable to produce the smallest amount of $NO_x$ possible with satisfactory engine performance. With specific reference to natural gas, the vertical line at an equivalence ratio of 1.25 represents the rich limit for ordinary driving conditions at less than full load, according to the present invention. Sustained operation at richer values can result in burned valves. Between stoichiometric and about 1.2 equivalence ratio is a region where high combustion gas temperatures coupled with available oxygen can result in valve burning and other engine damage. The lower limit of 1.25 corresponds to the maximum acceptable values of $NO_x$ in parts per million of about 350. The vertical line at an equivalence ratio of 1.35 represents the limit for satisfactory engine performance on natural gas. This limit represents an acceptable value for engine operation. Exceeding this upper equivalence ratio limit produces unsatisfactory engine performance because of power loss and increased fuel consumption. It is preferred, however, to operate at an equivalence ratio of 1.3 at loads less than full throttle. This represents a value for a broad range of engine designs wherein acceptable $NO_x$ values with acceptable engine performance are obtained.

Operation of an internal combustion engine with natural gas as a fuel with the air-fuel ratio expressed by equivalence ratios within the range of 1.25 to 1.35 is much leaner than the equivalence ratio corresponding to maximum power. When maximum power is needed, as determined by full throttle operation, the equivalence ratio should be shifted to the left in FIG. 2 toward the stoichiometric value of 1, or even to the left of this value to a fuel-rich condition. In accordance with the present invention, this is accomplished by a modulator wherein the fuel pressure is increased at full throttle operation. FIG. 3 depicts the effect of the modulator in graphic form. The solid line, indicated by reference numeral 40, represents the reference air pressure in the last stage of regulation in regulators 16, resulting from the use of the modulator. At full throttle, the pressure to the gas-air mixer is at a basic regulator setting of +2 inches of $H_2O$. At part throttle, however, a negative pressure of 2 inches of water is present as the reference air pressure in the last regulator stage. The fuel pressure to the fuel air mixer at part throttle is about atmospheric because of the additive effect of a spring force in the last stage regulator. At closed throttle, the fuel pressure returns to the basic setting of +2 inches of $H_2O$. The line shown by reference numeral 42 represents the pressure at the vacuum advance port of a standard carburetor. Line 44 represents engine intake manifold pressure. These two lines are colinear from full throttle to a point close to closed throttle. In the vicinity of closed throttle, the throttle butterfly valve of the carburetor masks the vacuum advance port from manifold pressure, resulting in the pressure at this point increasing rapidly to atmospheric.

Figure 5:
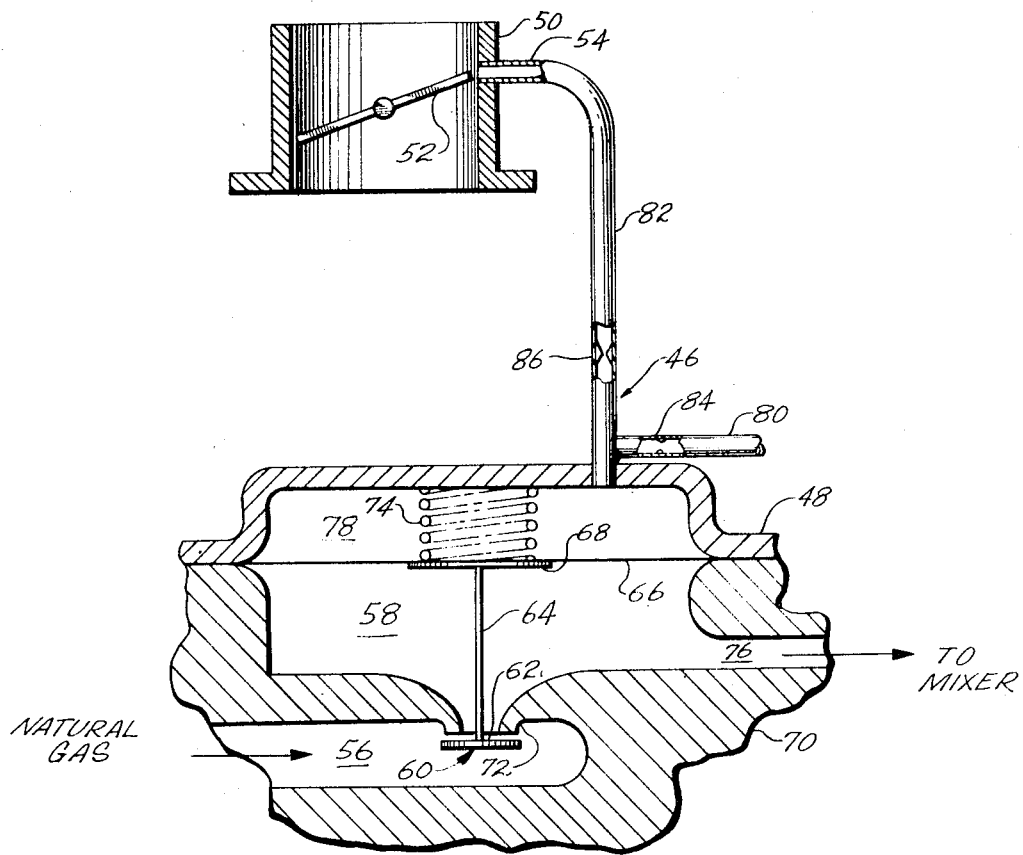
FIG. 5 illustrates a means for shifting the equivalence ratio towards a full power value for full throttle operation.

The shifting of the equivalence ratio towards stoichiometeric, or slightly beyond, for full power operation is obtained according to the present invention by a modulator in the form of a pressure divider 46, illustrated in FIG. 5. The pressure divider operates in conjunction with the vacuum advance port of carburetor 24, regulators 16, and a reference pressure tap at the air intake of carburetor 24. FIG. 5 depicts a regulator 48 of standard design which is the least stage regulator of regulators 16 from natural gas tank 12 to fuel-air mixer 20. It also illustrates a throttle body 50 of carburetor 24. A throttle butterfly valve 52 of standard design is disposed within the throttle body. A standard vacuum advance port 54 in its normal position extends through the wall of the throttle body for pressure communication with the body's interior. Regulator 48 receives natural gas from upstream regulation stages in passage 56 for admission into chamber 58. A regulator valve 60 having a valve disk 62 and a rod 64 is provided. A diaphragm 66 mounts a disk 68 which carries rod 64. Regulator 48 has a body 70 which defines a valve seat 72. Movement of the diaphragm, then, produces movement of valve disk 62 toward and away from seat 72 to close and open passage 56 to chamber 58, respectively. A spring 74 biases the diaphragm in a direction to open valve 60. A passage 76 leads from chamber 58 to fuel-air mixer 20. A chamber 78 above diaphragm 66 is in pressure communication with the air intake of fuel-air mixer 20 and vacuum advance port 54 through lines 80 and 82, respectively. Line 80 has an orifice 84 and line 82 has an orifice 86. Orifice 86 of line 82 is smaller than orifice 84 of line 80. It has been found that for fuel pressures of from −0.5 to +0.5 inches of $H_2O$ to fuel-air mixer 20 and with operation in an equivalence ratio range of from 1.25 to 1.35, orifice sizes for orifices 84 and 86 of drill sizes 40 and 60, respectively, provide satisfactory performance.

The pressure in upper chamber 78 determines the position of diaphragm 66 and hence the position of valve 60. The position of valve 60, of course, determines the amount of gas entering chamber 58. The fuel pressure in chamber 58 is a function of the pressure in upper chamber 78 and the force of spring 74. The pressure in upper chamber 78, however, is a function of the pressure across orifices 84 and 86. The pressure from the intake of fuel-air mixer 20, which is essentially atmospheric, is the reference pressure. Orifice 84 provides a pressure drop from atmospheric to effect the desired −2 inches of $H_2O$ pressure in chamber 78. The pressure in chamber 78 is also a function of the pressure drop across orifice 86 and the position of butterfly throttle valve 52. The resultant pressure in chamber 78, then, is a function of both of these pressure drops. With reference again to FIG. 3, it should be noted that for most throttle settings a value of −2 inches of $H_2O$ is the pressure in chamber 78. But at open throttle, this pressure increases to essentially atmospheric. This is because at open throttle, butterfly valve 52 is fully open and the dominant effect of pressure in chamber 78 is determined by atmospheric pressure. At less than full throttle, the pressure difference across orifice 86 will soon reach a maximum to assure the desired pressure to fuel-air mixer 20, notwithstanding the pressure at vacuum advance port 54. Because of the effect of spring 74 the gas pressure in passage 76 is atmospheric at part throttle and +2 inches of $H_2O$ at open throttle.

FIG. 4 illustrates the construction of fuel-air mixer 20 in greater detail. Except for a modification in a metering pin 90, the fuel-air mixer illustrated is desired in U.S. Pat. No. 2,927,848 to Baverstock and is currently being manufactured by IMPCO Division of A. J. Industries, Cerritos, Calif., as their model 300-A mixer.

Fuel-air mixer 20 has a body 90 and a diaphragm 94. The diaphragm separates the interior of the body into an upper chamber 96 and a lower chamber 98. A bridge 100 is carried by the diaphragm and provides purchase for a biasing spring 102. The spring extends for compressive engagement with an upper interior surface of body 92 which bounds chamber 96. The bridge has a plurality of slots 104 for fluid communication between chamber 96 and a passage 106. Passage 106 leads to carburetor 24 and through the carburetor to engine 18. A valve member 108 is also carried by diaphragm 94 for movement towards and away from an annular valve seat 110. The valve member has a passage 112 to provide communication between upper chamber 96 and passage 106. A passage 114 from regulator 16 supplies natural gas to upper chamber 96. Lower chamber 98 is in open fluid communication with atmosphere through a plurality of slots 115 in body 92 and an air cleaner 116. A pressure tap 118 in air cleaner 116 provides the reference pressure for pressure divider 46 through line 80. Passage 106 is defined by a duct 120 which has a flange 122 for mounting to carburetor 24.

Figure 6:
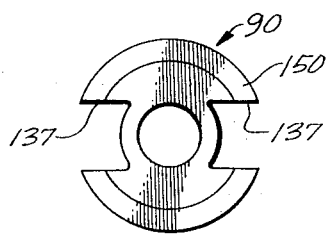
FIG. 6 depicts a top plan view of a modified metering pin of the gas-air mixer illustrated in FIG. 4.
Figure 7:
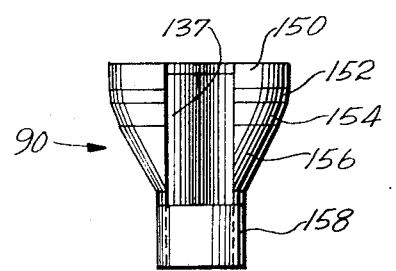
FIG. 7 depicts in elevation the modified metering pin of FIGS. 4 and 6.

Metering pin 90 is carried by bridge 100 through a screw 124 and a biasing spring 126. A gasket 128 is carried by the metering pin to seat on an annular valve seat 130 of body 92. A washer 132 provides a backing for gasket 128. Both the gasket and the washer are secured to metering pin 90 through screw 124. Biasing spring 126 urges the assembly of the metering pin, gasket and washer into engagement with a head 134 of screw 124. A right cylindrical passage 136 in body 92 is for the passage of gas into upper chamber 96. For low throttle conditions, metering pin 90 prevents gas flow through passage 136 except through slots 37 of the pin, (see FIG. 6). A plug 138 provides access to screw 124 for idle adjustment. Idle adjustment is effected by adjusting the position of gasket 128 toward and away from seat 130.

The fuel-air mixer operates generally as follows. Atmospheric pressure is present in lower chamber 98. When the pressure within passage 106 is also atmospheric, valve member 108 is seated on seat 110. When the pressure in the passage becomes less than atmospheric, the pressure in upper chamber 96 becomes negative allowing the pressure in lower chamber 98 to bias diaphragm 94 upwardly against the combined effects of spring 102 and the negative pressure in the upper chamber. This lifts metering pin 90 upwardly to present a greater flow area through passage 136 from passage 114 to upper chamber 96. With larger and larger negative pressures in upper chamber 96, more and more gas will be admitted by the metering pin.

As was previously mentioned, the fuel-air mixer is standard except for the modified metering pin. The modification of the metering pin is to effect an equivalence ratio between 1.25 and 1.35 over the 7-mode cycle, except at full throttle where the effect of modulator 46 enriches the air-fuel ratio. The metering pin is modified to effect this range of fuel-air ratios with a gas supply pressure from regulators 16 of from $-0.5$ inches $H_2O$ to $+0.5$ inches $H_2O$ and with the characteristics of fuel-air mixer 20 as supplied by IMPCO Division of A. J. Industries taken into account.

The characteristics of fuel-air mixer 20 which affect the characteristics of metering pin 90 and the attainment of the desired equivalence ratio are as follows: the diameter of passage 136, the diameter of passage 106, the diameter of diaphragm 94 exposed to the pressure of chambers 96 and 98, the spring constant of spring 102, and the preload of spring 102.

The geometry of pin 90 also affects the desired equivalence ratio. For this reason, pin 90 will now be described in detail. Pin 90 has a pair of diametrically opposed, longitudinal slots 137. Slots 137 are 0.25 inches wide and extend radially inward to a diameter of 0.281 inches. The crown of the pin, indicated by reference numeral 150, is right cylindrical and has a diameter of about 0.626 inches. The crown section has a longitudinal length of about 0.065 inches. A pilot section 152 of 0.050 inches of longitudinal length tapers at an angle of about 6° toward the bottom of the pin. A second tapered section 154 with a taper of about 20° extends longitudinally from a junction with section 152 to meet a third tapered section 156. The lower terminus of section 154 from the top of the pin is 3/16 of an inch. The third tapered section 156 has a taper of about 30° and meets a right cylindrical barrel portion 158 at the latter's outside diameter of about 0.281 inches; barrel portion 158 receives screw 124 with a sliding fit.

With the geometry of pin 90 as just described, the specific values of the characteristics of fuel-air mixer 20 which effect an equivalence ratio range of from 1.25 to 1.35 at a gas pressure of $-0.5$ inches of $H_2O$ $+0.5$ inches of $H_2O$ in passage 114 are as follows:
a. Diameter of passage 136 = about 0.627 inches
b. Diameter of passage 106 = about 2.8 inches
c. Diameter of diaphragm 94 = about 5.0 inches
d. Spring constant of spring 102 = about 2 lbs./inch
e. Spring preload of spring 102 = about 1.2 lbs.

It has been found that natural gas, which contains a high percentage of methane, within the equivalence ratio of from 1.25 to about 1.35 produces very low amounts of $NO_x$ and other pollutants in the exhaust gas emissions of a variety of internal combustion engines. This is specifically illustrated in FIG. 8. In FIG. 8, three charts are presented showing in grams/mile the relative amounts of carbon monoxide, hydrocarbons, and oxides of nitrogen for natural gas and gasoline for the engine types shown at the bottom of the Figure. These comparisons are for the 7-mode cycle.

It has been found, however, that even greater reductions in the amount of $NO_x$ in the exhaust gas is obtained with pure methane over than obtained with natural gas. This is illustrated in the following table which shows the amount of $NO_x$ in parts per million for the two types of fuel in a 1968 Ford V-8 having 289 cu. inch displacement and an automatic transmission.

TABLE

| Mileage | Fuel | % $CH_4$ | $NO_x$ (p.p.m.) |
| --- | --- | --- | --- |
| 9,568 | Liquid Natural Gas (Vapor) | 98 | 133 |
| 9,568 | (Liquid) Natural Gas Liquid | 86 | 248 |
| 13,511 | Pure Methane | 99.6 | 64 |
| 14,060 | Natural Gas | 89 | 233 |

I claim:
1. A method for reducing the amount of $NO_x$ in the exhaust gas emissions of a multiple cylinder internal combustion engine comprising the steps of:
  a. mixing a gaseous fuel with air to obtain a gaseous fuel-air mixture with an equivalence ratio of from about 1.25 to about 1.35;
  b. introducing the mixture into the combustion chambers of an internal combustion engine for burning therein; and
  c. burning the mixture within the combustion chambers to operate the internal combustion engine.
2. The method claimed in claim 1 including the additional step of changing the equivalence ratio at full throttle of the internal combustion engine from within the specified range to a fuel richer value of at least about stoichiometric.
3. The method claimed in claim 1 wherein the gaseous fuel is natural gas.
4. The method claimed in claim 1 wherein the gaseous fuel is methane.
5. The method claimed in claim 1 including the additional step of regulating the pressure of the gaseous fuel before the mixing step to a pressure of from about $-0.5$ inches of $H_2O$ to about $+0.5$ inches of $H_2O$.
6. The method claimed in claim 2 including the additional step of regulating the pressure of the gaseous fuel before the mixing step to a pressure of from about $-0.5$ inches of $H_2O$ to about $+0.5$ inches of $H_2O$.
7. The method claimed in claim 1 wherein the mixing step produces an equivalence ratio of about 1.3.
8. A system for reducing the amount of $NO_x$ in the exhaust gas emissions of an internal combustion engine comprising:
  a. gaseous fuel regulator means for receiving a gaseous fuel from a source thereof and for delivering gaseous fuel within a predetermined pressure range;
  b. a fuel-air mixer in gaseous fuel communication with the regulator means to receive gaseous fuel at pressures within the predetermined pressure range, the fuel-air mixer being operable to mix gaseous fuel from the regulator means with air; and
  c. the regulator means and the fuel-air mixer being operable to produce a gaseous fuel-air mixture for introduction into the internal combustion engine within an equivalence ratio range of from about 1.25 to about 1.35.
9. The system claimed in claim 8 including means for changing the equivalence ratio at full power of the internal combustion engine to a fuel richer value of at least about stoichiometric.
10. The system claimed in claim 8 wherein the gaseous fuel regulator means is operable to deliver gaseous fuel within a predetermined pressure range of from about $-0.5$ inches of $H_2O$ to about $+0.5$ inches of $H_2O$.

11. The system claimed in claim 9 including means for changing the equivalence ratio at full power of the internal combustion engine to a fuel richer value of at least about stoichiometric.

12. The system claimed in claim 8 wherein the means for obtaining a gaseous fuel-air mixture is operable to produce a gaseous fuel-air mixture with an equivalence ratio of about 1.3.

* * * * *

PO-1050
(5/69)

UNITED STATES PATENT OFFICE
CERTIFICATE OF CORRECTION

Patent No. 3,650,255          Dated March 21, 1972

Inventor(s) Robert W. McJones

It is certified that error appears in the above-identified patent and that said Letters Patent are hereby corrected as shown below:

In the specification: Column 1, line 41 "for" should be --from--; line 42 "referred" should be --preferred--; line 46 "chamber" should be --chambers--. Column 3, lines 58 and 59 "stoichiometeric" should be --stoichiometric--; line 65 "least" should be --last--. Column 4, line 46 "desired" should be --described--; line 63 "16" should be --48--. Column 5, line 5 "37" should be --137--; line 61 "$H_2O$ + 0.5" should be --$H_2O$ to + 0.5--. Column 6, line 5 "than" should be --that--; line 17 "(Liquid)" should be --Liquid--; line 18 "Liquid" should be --(Liquid)--; line 20 "233" should be --223--.

Signed and sealed this 9th day of January 1973.

(SEAL)
Attest:

EDWARD M. FLETCHER, JR.          ROBERT GOTTSCHALK
Attesting Officer                Commissioner of Patents